(12) United States Patent
Zhao et al.

(10) Patent No.: US 9,450,912 B2
(45) Date of Patent: Sep. 20, 2016

(54) METHOD AND DEVICE FOR ACCESSING APPLICATION SERVER

(71) Applicant: Tencent Technology (Shenzhen) Company Limited, Shenzhen (CN)

(72) Inventors: Jie Zhao, Shenzhen (CN); Feng Liu, Shenzhen (CN); Tao Tang, Shenzhen (CN); Jianbing Fu, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

(21) Appl. No.: 14/758,089

(22) PCT Filed: Aug. 16, 2013

(86) PCT No.: PCT/CN2013/081605
§ 371 (c)(1),
(2) Date: Jun. 26, 2015

(87) PCT Pub. No.: WO2014/101433
PCT Pub. Date: Jul. 3, 2014

(65) Prior Publication Data
US 2015/0334086 A1    Nov. 19, 2015

(30) Foreign Application Priority Data
Dec. 27, 2012 (CN) .......................... 2012 1 0580442

(51) Int. Cl.
*G06F 15/173* (2006.01)
*H04L 29/12* (2006.01)
(Continued)

(52) U.S. Cl.
CPC ....... *H04L 61/2503* (2013.01); *G06F 11/2012* (2013.01); *H04L 47/125* (2013.01); *H04L 67/1002* (2013.01); *G06F 2201/85* (2013.01); *H04L 61/6068* (2013.01)

(58) Field of Classification Search
USPC ................................. 709/225, 220, 223, 222
See application file for complete search history.

(56) References Cited

U.S. PATENT DOCUMENTS

2008/0040573 A1* 2/2008 Malloy ............. H04L 29/12028
711/202
2008/0235185 A1    9/2008 Fratti et al.
(Continued)

FOREIGN PATENT DOCUMENTS

CN    101521924 A    9/2009
CN    102076060 A    5/2011
(Continued)

OTHER PUBLICATIONS

International Search Report for the corresponding PCT Application No. PCT/CN2013/081605, dated Nov. 21, 2013, 7p.

*Primary Examiner* — Lan-Dai T Truong
(74) *Attorney, Agent, or Firm* — Brinks Gilson & Lione

(57) ABSTRACT

Provided is a method for accessing an application server. The method includes: obtaining an IP address or server domain name for accessing an application server from an access point list; initiating an access to the application server using the IP address or server domain name; and after the access to the application server succeeds, updating the access point list by storing an IP address delivered by the application server according to a load balancing policy to a blank entry of the access point list. By performing load balancing at an application server side according to the characteristics of an application program, the method improves the success rate of access by a user.

10 Claims, 10 Drawing Sheets

```
┌──────────────────────────────────────────────┐  S101
│  obtaining an IP address or a server domain name for
│  accessing an application server from an access point list
└──────────────────────────────────────────────┘
                      │
                      ▼
┌──────────────────────────────────────────────┐  S102
│  Initiating an access to the application server by using the
│  IP address or server domain name
└──────────────────────────────────────────────┘
                      │
                      ▼
┌──────────────────────────────────────────────┐  S103
│  updating, after the access to the application server
│  succeeds, the access point list by storing an IP address
│  delivered, according to a load balancing policy, by the
│  application server to a blank entry of the access point list
└──────────────────────────────────────────────┘
```

(51) Int. Cl.
*H04L 12/803* (2013.01)
*G06F 11/20* (2006.01)
*H04L 29/08* (2006.01)

(56) References Cited

U.S. PATENT DOCUMENTS

2008/0320003 A1* 12/2008 Heinson ............ H04L 29/12066

2011/0153840 A1* 6/2011 Narayana ............ H04L 67/1029
 709/227

FOREIGN PATENT DOCUMENTS

CN 102625468 A 8/2012
WO WO 2007/045181 A1 4/2007

* cited by examiner

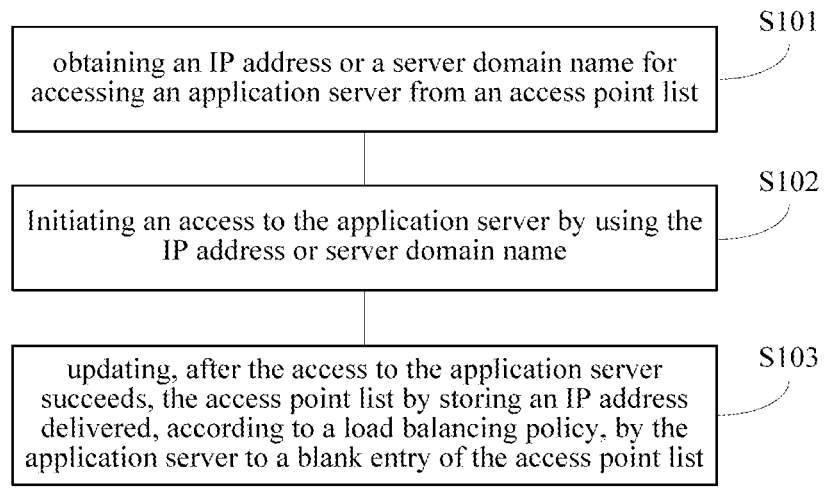
FIG. 1
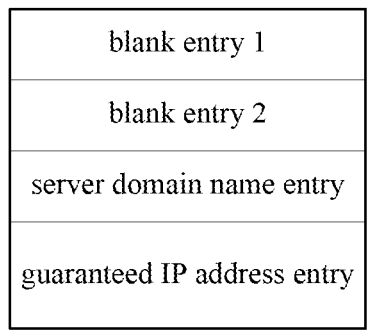
FIG. 2-a
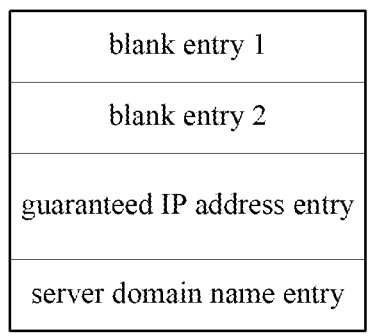
FIG. 2-b

| blank entry 1 |
|---|
| IP2 |
| server domain name entry |
| guaranteed IP address entry |

FIG. 3-a

| IP1 |
|---|
| IP2 |
| server domain name entry |
| guaranteed IP address entry |

FIG. 3-b

| IP3 |
|---|
| IP2 |
| server domain name entry |
| guaranteed IP address entry |

FIG. 4-a

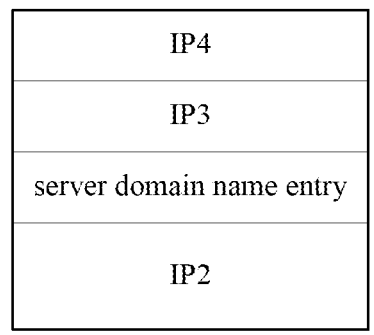
FIG. 4-b

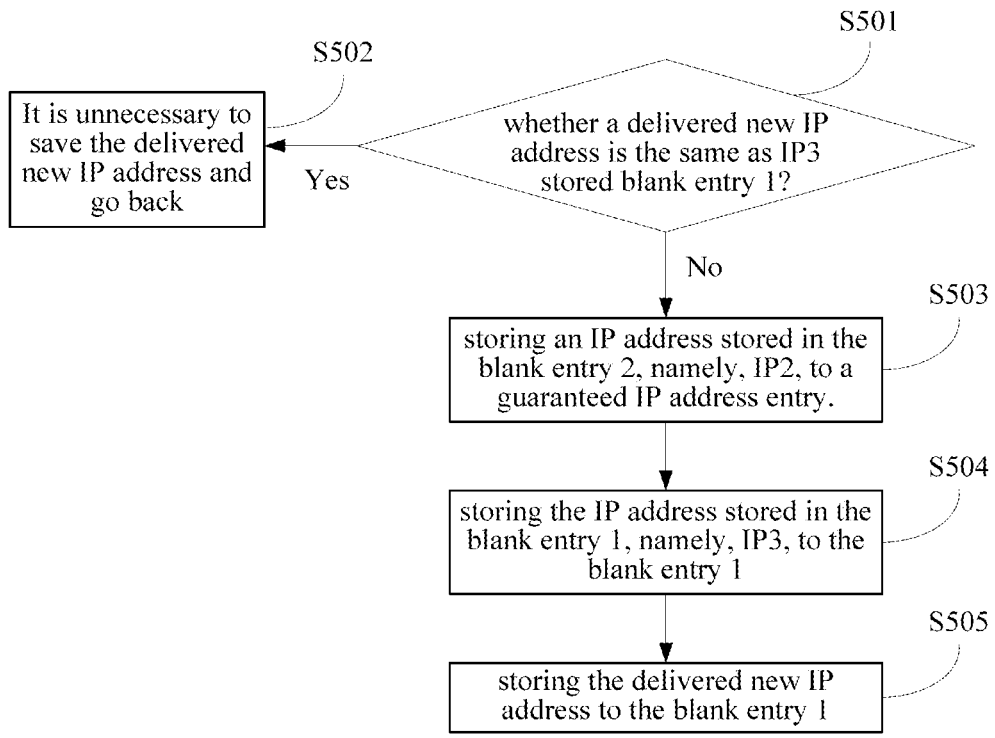
FIG. 5-a
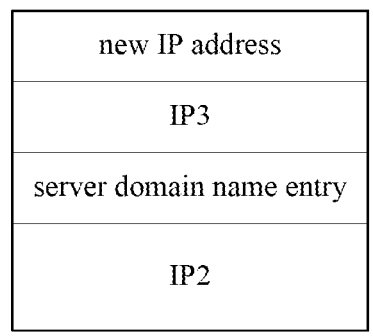
FIG. 5-b

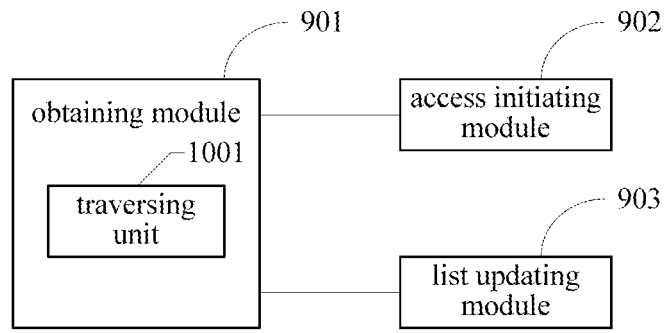
FIG. 10
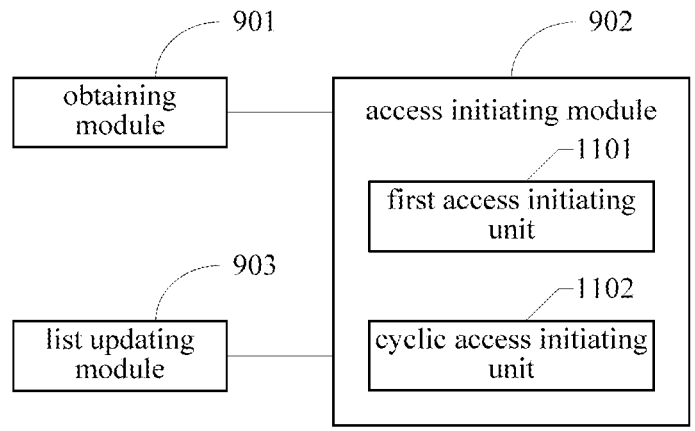
FIG. 11
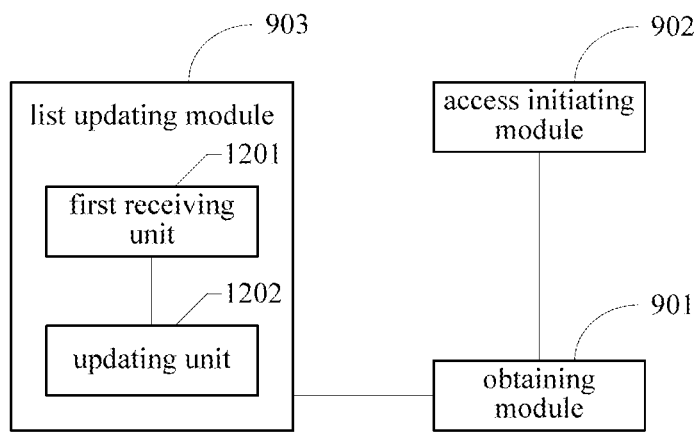
FIG. 12-a

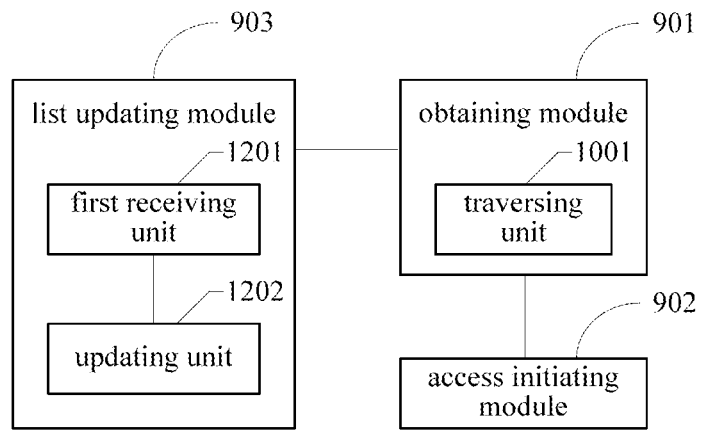
FIG. 12-b
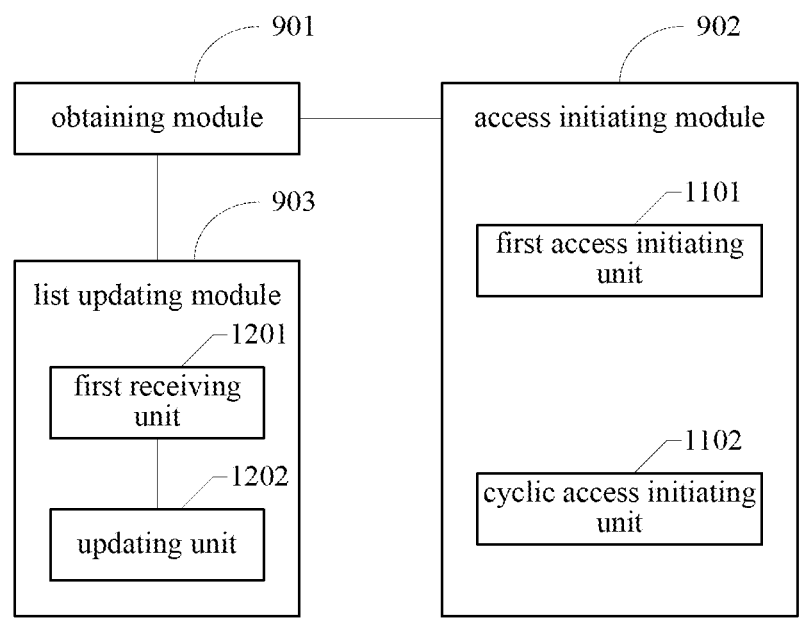
FIG. 12-c

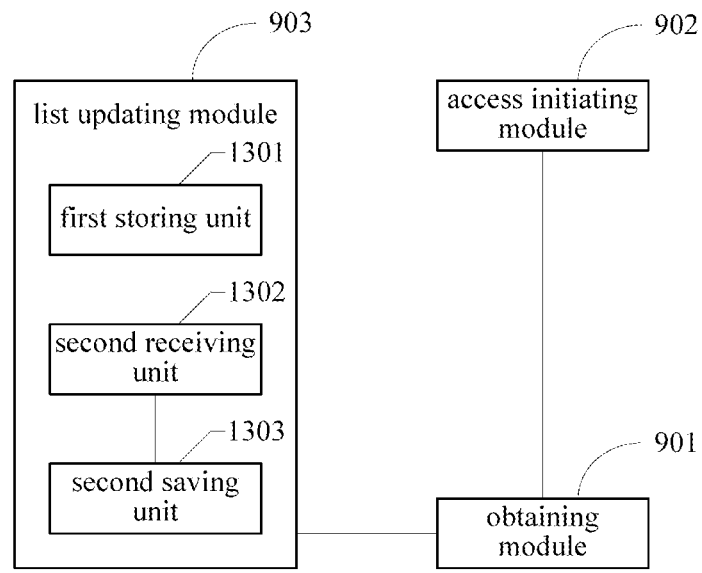
FIG. 13-a
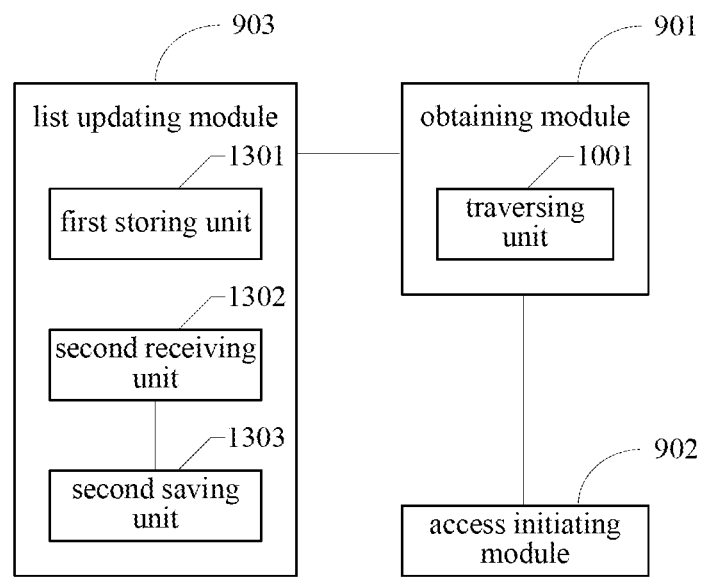
FIG. 13-b

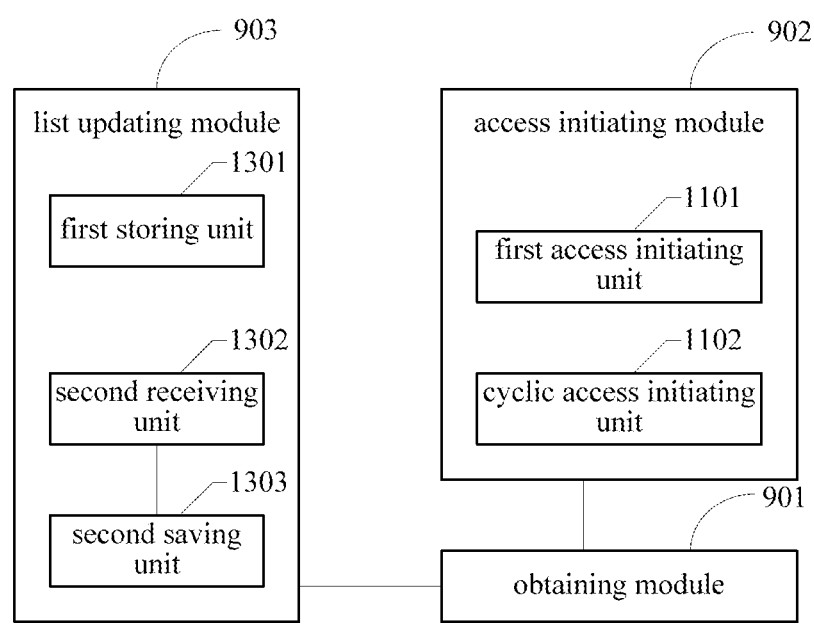
FIG. 13-c

METHOD AND DEVICE FOR ACCESSING APPLICATION SERVER

RELATED APPLICATION

This application is a US national phase application of International Application No. PCT/CN2013/081605 filed on Aug. 16, 2013, which claims priority to Chinese Patent Application No. 201210580442.9, entitled "METHOD AND DEVICE FOR ACCESSING APPLICATION SERVER" filed with the Chinese Patent Office on Dec. 27, 2012, which is incorporated by reference in its entirety.

FIELD OF THE TECHNOLOGY

The present disclosure relates to the field of Internet applications.

BACKGROUND OF THE DISCLOSURE

With the development of intelligent terminal technologies, functions of various intelligent terminals, such as smart phone and tablet computer, get more powerful, for example, the increasing number of client applications can be installed and run on the intelligent terminals. Moreover, with the development of Internet technologies, the manner of a client application accessing to an application server via the Internet is common for a user in using an intelligent terminal.

In the existing technology, a client application accesses an application server by using a fixed Internet Protocol (IP) address.

A major defect of the existing manner for accessing an application server is incapability of adapting to changes. When a service amount gradually increases, after a new IP address is added for an application server, client applications that have been delivered are unaware of the new IP address and still connect to an original IP address, so that the load on the application server corresponding to the new IP address is small, while the load on the application server corresponding to the original IP address is large.

SUMMARY

According to the Embodiments of the present disclosure, it is provided a method for accessing an application server and a device thereof, to solve at least one of the foregoing problems.

According to an embodiment of the present disclosure, it is provided a method for accessing an application server, the method including:

obtaining an IP address or a server domain name for accessing an application server from an access point list, where the access point list includes a guaranteed IP address entry, a server domain name entry, and at least one blank entry for storing a new IP address;

initiating an access to the application server by using the IP address or server domain name; and updating, after the access to the application server succeeds, the access point list by storing an IP address delivered, according to a load balancing policy, by the application server to a blank entry of the access point list.

According to an embodiment of the present disclosure, it is provided a device for accessing an application server, the device includes:

an obtaining module, configured to obtain an IP address or a server domain name for accessing an application server from an access point list, where the access point list includes a guaranteed IP address entry, a server domain name entry, and at least one blank entry for storing a new IP address;

an access initiating module, configured to initiate an access to the application server by using the IP address or server domain name; and a list updating module, configured to update, after the access to the application server succeeds, the access point list by storing an IP address delivered, according to a load balancing policy, by the application server to a blank entry of the access point list.

According to an embodiment of the present disclosure, it is provided a non-transitory computer readable storage medium, having computer executable instructions stored therein and performing the following steps when the computer executable instructions are run in a computer:

obtaining an IP address or a server domain name for accessing an application server from an access point list, where the access point list includes a guaranteed IP address entry, a server domain name entry, and at least one blank entry for storing a new IP address;

initiating an access to the application server by using the IP address or server domain name; and updating, after the access to the application server succeeds, the access point list by storing an IP address delivered by the application server to a blank entry of the access point list.

In the embodiments of the present disclosure, after the access to the application server succeeds, the access point list is updated by storing the IP address delivered, according to the load balancing policy, by the application server to a blank entry of the access point list. As compared with the conventional art, with the method according to the embodiments of the present disclosure, an access success rate of a user by performing load balancing is improved according to characteristics of the application on an application server side.

BRIEF DESCRIPTION OF THE DRAWINGS

The aforementioned features and advantages of the disclosure as well as additional features and advantages thereof will be more clearly understood hereinafter as a result of a detailed description of preferred embodiments when taken in conjunction with the drawings.

FIG. 1 illustrates a flowchart of a method for accessing an application server according to a first embodiment of the present disclosure;

FIG. 2-a illustrates a schematic diagram of an access point list during initialization according to an embodiment of the present disclosure;

FIG. 2-b illustrates another schematic diagram of an access point list during initialization according to an embodiment of the present disclosure;

FIG. 3-a illustrates a schematic diagram of a new IP address delivered by an access server in an access point list according to an embodiment of the present disclosure;

FIG. 3-b illustrates another schematic diagram of a new IP address delivered by an access server in an access point list according to an embodiment of the present disclosure;

FIG. 4-a illustrates another schematic diagram of a new IP address delivered by an access server in an access point list according to an embodiment of the present disclosure;

FIG. 4-b illustrates another schematic diagram of a new IP address delivered by an access server in an access point list according to an embodiment of the present disclosure;

FIG. 5-a illustrates a flowchart of updating an access point list according to a third embodiment of the present disclosure;

FIG. 5-b illustrates a schematic diagram of the access point list after storing the new IP address delivered by the access server in the access point list as illustrated in FIG. 4-a;

FIG. 10 illustrates a structural schematic diagram of a device for accessing an application server according to an eighth embodiment of the present disclosure;

FIG. 11 illustrates a structural schematic diagram of a device for accessing an application server according to a ninth embodiment of the present disclosure;

FIG. 12-a illustrates a structural schematic diagram of a device for accessing an application server according to a tenth embodiment of the present disclosure;

FIG. 12-b illustrates a structural schematic diagram of the device for accessing an application server according to the tenth embodiment of the present disclosure;

FIG. 12-c illustrates a structural schematic diagram of the device for accessing an application server according to the tenth embodiment of the present disclosure;

FIG. 13-a illustrates a structural schematic diagram of a device for accessing an application server according to an eleventh embodiment of the present disclosure;

FIG. 13-b illustrates a structural schematic diagram of the device for accessing an application server according to the eleventh embodiment of the present disclosure; and FIG. 13-c illustrates a structural schematic diagram of the device for accessing an application server according to the eleventh embodiment of the present disclosure.

DESCRIPTION OF EMBODIMENTS

Figure 6:
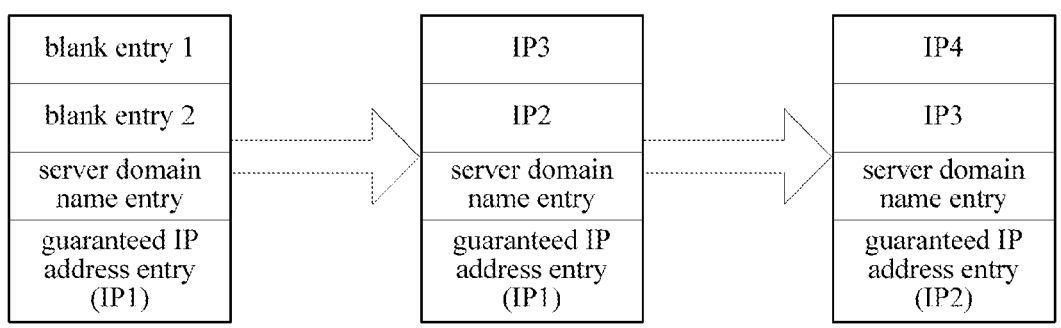
FIG. 6 illustrates a schematic diagram of a variation of an access point list after an applicant server delivers a new IP address according to a fourth embodiment of the present disclosure.

The technical solution of the present disclosure will be clearly and completely described in the following with reference to the accompanying drawings. It is obvious that the embodiments to be described are only a part rather than all of the embodiments of the present disclosure. All other embodiments obtained by persons of ordinary skill in the art based on the embodiments of the present disclosure without creative efforts shall fall within the protection scope of the present disclosure.

Reference may be made to FIG. 1, which is a flowchart of a method for accessing an application server according to a first embodiment of the present disclosure, the method may be executed by an intelligent terminal or an application module of an intelligent terminal, and the method includes step S101, step S102, and step S103.

Step S101 may include obtaining an IP address or a server domain name for accessing an application server from an access point list.

In this embodiment, an intelligent terminal maintains an access point list including accessible IP addresses and server domain names, and the access point list is dynamically variable and includes a guaranteed IP address entry, a server domain name entry, and at least one blank entry used for storing a new IP address. The blank entry may be located before the IP address entry and server domain name entry. The server domain name entry is used for storing a server domain name, and keeps invariable; the guaranteed IP address entry is used for storing a guaranteed IP address. The guaranteed IP address exists during access point initialization; and in the case of obtaining an IP address or accessing the application server by parsing the server domain name stored in the domain name entry fails, the IP address can still be used for accessing to the application server. FIG. 2-a and FIG. 2-b are both schematic diagrams of an access point list during initialization according to this embodiment, and the two access point list schematic diagrams respectively include an guaranteed IP address entry, a server domain name entry, and two blank entries (a blank entry 1 and a blank entry 2) used for storing a new IP address.

In this embodiment, the obtaining an IP address or a server domain name for accessing an application server from an access point list may include: traversing the access point list with an initial position of the access point list as a starting point and using an IP address or a server domain name which is obtained initially during the traversing as the IP address or server domain name for accessing the application server. For example, with regard to the access point list illustrated in FIG. 2-a, neither of the blank entries thereof has an IP address during initialization, and the blank entry 2 may be used as an initial position of the access point list to start traversing the access point list. In FIG. 2-a, because the server domain name entry is located before the guaranteed IP address entry, a server domain name, first obtained during the traversing, in the server domain name entry is used as the server domain name for accessing the application server. With regard to the access point list illustrated in FIG. 2-b, neither of the blank entries thereof has an IP address during initialization, and the blank entry 2 may be used as an initial position of the access point list to start traversing the access point list. In FIG. 2-b, because the guaranteed IP address entry is located before the server domain name entry, a guaranteed IP address, which is obtained initially during the traversing, in the guaranteed IP address entry is used as the guaranteed IP address entry for accessing the application server.

Step S102 may include initiating an access to the application server by using the IP address or server domain name.

In this embodiment, the initiating an access to the application server by using the obtained IP address or server domain name may include: initiating a first access to the application server by using the obtained IP address or server domain name; if the first access to the application server fails, obtaining other IP address or server domain name for accessing the application server from the access point list until the access to the application server succeeds. For example, it is assumed that an IP address (including the guaranteed IP address in the guaranteed IP address entry or the new IP address stored in the blank entry) is obtained, access to the application server may be initiated by using a method for accessing an application server by using a fixed IP address in the conventional art. If a server domain name in the server domain name entry is obtained, a domain name address parsing request is sent to a domain name server, after receiving the parsing request, the domain name server returns an IP address in response to a client application, and the client application further initiates, according to the IP address returned by the domain name server, the access to the application server.

Step S103 may include updating, after the access to the application server succeeds, the access point list by storing an IP address delivered, according to a load balancing policy, by the application server to a blank entry of the access point list.

In this embodiment, the load balancing policy may include a static load balancing policy and a dynamic load balancing policy. The static load balancing policy is a method of using average load information of a system but ignoring a current load status of the system. For example, a round robin algorithm is a typical static load balancing policy, in which it is considered that a processing capability of a cluster server has no difference at any time, all of requests from a network are allocated to all servers in the cluster server in turn from 1 to N, and then the allocation is restarted from 1. In this embodiment, the static load balancing policy may include one or any combination of a round robin algorithm, a priority algorithm, an IP-based algorithm, a header/request-based algorithm, and a cookie-based algorithm. The dynamic load balancing policy is a method of adjusting task allocation according to a current load status of a system. For example, a weighted round robin algorithm is a typical dynamic load balancing policy, in which a weight is dynamically adjusted by taking a performance difference between servers and a current load status of a server into consideration, and task requests are allocated to all servers by means of a round robin method in order of weight. A server having a high weight can process more task requests than a server having a low weight. In this embodiment, the dynamic load balancing policy includes one or any combination of a weighted round robin algorithm, a least connection algorithm, a weighted least connection algorithm, a locality-based least connection algorithm, a locality-based least connection with duplication algorithm, and a fastest response algorithm. For example, if a number of connections on a server is recorded in load information of the server, the load balancing policy may be a policy of using the least connections, that is, when a load balancing device selects a server to serve a client that currently initiates a request, the load balancing device may select a server having the least connections thereon to serve this request.

In this embodiment, upon the access to the application server succeeds, the access point list is updated and an IP address delivered, according to a load balancing policy, by the application server is stored to a blank entry of the access point list, and this process may include receiving an IP address delivered, according to the load balancing policy, by the application server after the access to the application server succeeds; and storing the IP address delivered, according to the load balancing policy, by the application server to the blank entry. For example, it is assumed that after the application server is accessed, the blank entry 2 in the access point list illustrated in FIG. 2-*a* includes one IP address (which is assumed to be IP2), as shown in FIG. 3-*a*. It is further assumed that the application server is successfully accessed by using the IP2, the application server would deliver, according to the load balancing policy, a new IP address and record the new IP address as IP3. A client receives the delivered new IP address, namely, the IP3, and stores the IP address delivered, according to the load balancing policy, by the application server, namely, the IP3, to the blank entry 1 in the access point list, and the access point list after the IP3 is stored is shown in FIG. 3-*b*.

In a second embodiment of the present disclosure, an access point list includes multiple blank entries. After access to an application server succeeds, an access point list is updated and an IP address delivered, according to a load balancing policy, by the application server is stored to a blank entry of the access point list, and this process may include: storing an IP address during a first access success to a blank entry of the access point list; receiving an IP address delivered, according to a load balancing policy, by the application server; and storing the IP address delivered, according to the load balancing policy, by the application server to a blank entry of the access point list. Because the access point list in this embodiment includes multiple blank entries, the IP address delivered, according to the load balancing policy, by the application server may be stored to a blank entry at an initial position of the access point list. The IP address during the first access success is a guaranteed IP address in a guaranteed IP address entry or an IP address obtained by parsing a server domain name in a domain name entry. For example, it is assumed that the application server is accessed by using an IP address obtained by parsing a server domain name in the access point list illustrated in FIG. 2-*a*, the IP address is recorded as IP2. It is further assumed that the application server is successfully accessed by using the IP2, the application server would deliver, according to the load balancing policy, a new IP address and record the new IP address as IP3. A client receives the delivered new IP address, namely, the IP3, and because the initial position of the access point list at this time is the blank entry 1, the IP address delivered, according to the load balancing policy, by the application server, namely, the IP3, can be stored to the blank entry 1 in the access point list, and the access point list after the IP3 is stored is shown in FIG. 4-*a*. When the application server is accessed for a next time, the access point list illustrated in FIG. 4-*a* is traversed, and if the application server is successfully accessed by using the IP3, the application server delivers a new IP address according to the load balancing policy and record the new IP address as IP4. The client receives the delivered new IP address, namely, the IP4, and because the initial position of the access point list at this time is the blank entry 1, the new IP address delivered, according to the load balancing policy, by the application server, namely, the IP4, can be stored to the blank entry 1 in the access point list, and the access point list after the IP4 is stored is shown in FIG. 4-*b*.

It could be known from the method for accessing an application server according to the second embodiment, after the access to the application sever succeeds, the access point list is updated by storing the IP address delivered, according to the load balancing policy, by the application server to a blank entry of the access point list. As compared with the conventional art, with the method according to this embodiment, an access success rate of a user by performing load balancing is improved according to characteristics of the application on an application server side.

A third embodiment of the present disclosure uses an access point list illustrated by FIG. 4-*a* (it is assumed that a guaranteed IP address is IP1) as an example to briefly describe a process of updating an access point list. In this embodiment, a blank entry 1, a blank entry 2, and a guaranteed IP address entry in the access point list are all dynamically variable except that a server domain name in a server domain name entry of the access point list is invariable. After a client successfully establishes a TCP connection or a server delivers a new IP address according to a balancing policy, the client stores the new IP address to the access point list, and a process for storing, by the client, a new IP address to the access point list is shown in FIG. 5-*a* and includes steps S501 to S505.

Step S501 may include determining whether a delivered new IP address is the same as an IP address stored in the blank entry 1, namely, IP3.

If the delivered new IP address is the same as the IP address stored in the blank entry 1, namely, the IP3, the process proceeds to step S502; or otherwise, the process proceeds to step S503

Step S502 may include ending the process, because it is unnecessary to save the delivered new IP address.

Step S503 may include storing an IP address stored in the blank entry 2, namely, IP2, to a guaranteed IP address entry.

Step S504 may include storing the IP address stored in the blank entry 1, namely, IP3, to the blank entry 2.

Step S505 may include storing the delivered new IP address to the blank entry 1.

The access point list illustrated in FIG. 4-*a* after the new IP address is stored is shown in FIG. 5-*b*.

A fourth embodiment of the present disclosure uses successfully accessing an application server by using a server domain name in a server domain name entry as an example to describe a variation process of an access point list (it is assumed that a guaranteed IP address is IP1), and as shown in FIG. 6, the description is as follows:

before a first access, both a blank entry 1 and a blank entry 2 are blank, and as shown in an access point list 601 in FIG. 6, after traversing, the first access is started by using a server domain name of a server domain name entry;

the first access includes: parsing the server domain name of the server domain name entry to obtain IP2, using the IP2 to perform a successful access, and after the access succeeds, returning IP3 by the application server;

after the first access, the IP2 and IP3 are stored, where the IP3 is stored in the blank entry 1 and the IP2 is stored in the blank entry 2, both of the server domain name and guaranteed IP address of the server domain name entry and guaranteed IP address entry keep invariable, as shown in an access point list 602 in FIG. 6;

before a second access, the IP3 is stored in the blank entry 1, the IP2 is stored in the blank entry 2, the server domain name is still stored in the server domain name entry, and the IP1 is still stored in the guaranteed IP address entry;

the second access includes: performing successful access by using the IP3 of the blank entry 1 and after the access succeeds, delivering a new IP address, namely, IP4, by the application server; and after the second access, the IP3 and IP4 are stored, where the IP4 is stored in the blank entry 1, the IP3 is stored in the blank entry 2, the server domain name is still stored in the server domain name entry, and the IP2 is still stored in the guaranteed IP address entry, as shown in an access point list 603 in FIG. 6.

Figure 7:
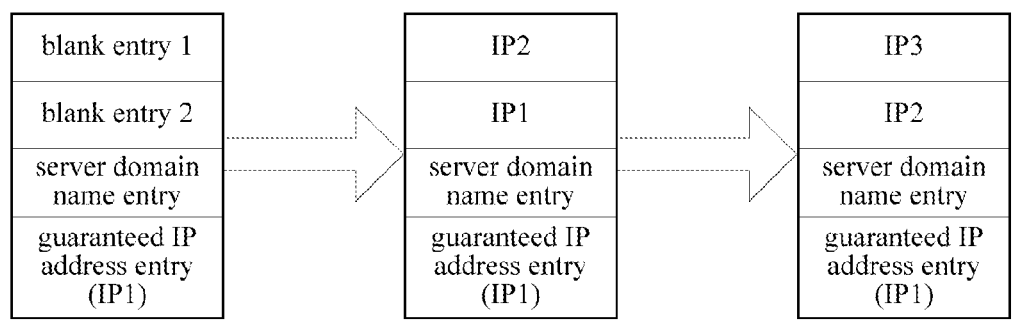
FIG. 7 illustrates a schematic diagram of a variation of an access point list after an applicant server delivers a new IP address according to a fifth embodiment of the present disclosure.

A fifth embodiment of the present disclosure uses successfully accessing an application server by using a server domain name in a server domain name entry as an example to describe a variation process of an access point list (it is assumed that an guaranteed IP address is IP1), and as shown in FIG. 7, the description is as follows:

before a first access, both a blank entry 1 and a blank entry 2 are blank, and as shown in an access point list 701 in FIG. 7, after traversing, the first access is started by using a server domain name of a server domain name entry;

the first access includes: if parsing the server domain name fails, performing successful access by using a guaranteed IP address stored in a guaranteed IP address entry, namely, IP1, and after the access succeeds, delivering a new IP address, namely, IP2, by the application server;

after the first access, the IP1 and IP2 are stored, where the IP2 is stored in the blank entry 1, the IP1 is stored in the blank entry 2, both of the server domain name and guaranteed IP address of the domain name entry and guaranteed IP address entry keep invariable, that is, the guaranteed IP address of the guaranteed IP address entry is IP1, as shown in an access point list 702 in FIG. 7;

before a second access, the IP2 is stored in the blank entry 1, the IP1 is stored in the blank entry 2, the server domain name is still stored in the server domain name entry, and the IP1 is still stored in the guaranteed IP address entry;

the second access includes: performing successful access by using the IP2 stored in the blank entry 1 and after the access succeeds, delivering a new IP address, namely, IP3, by the application server; and after the second access, the IP2 and IP3 are stored, where the IP3 is in the blank entry 1, the IP2 is stored in the blank entry 2, the server domain name is still stored in a server domain name entry, and the IP1 is still stored in the guaranteed IP address entry, as shown in an access point list 703 in FIG. 7.

Figure 8:
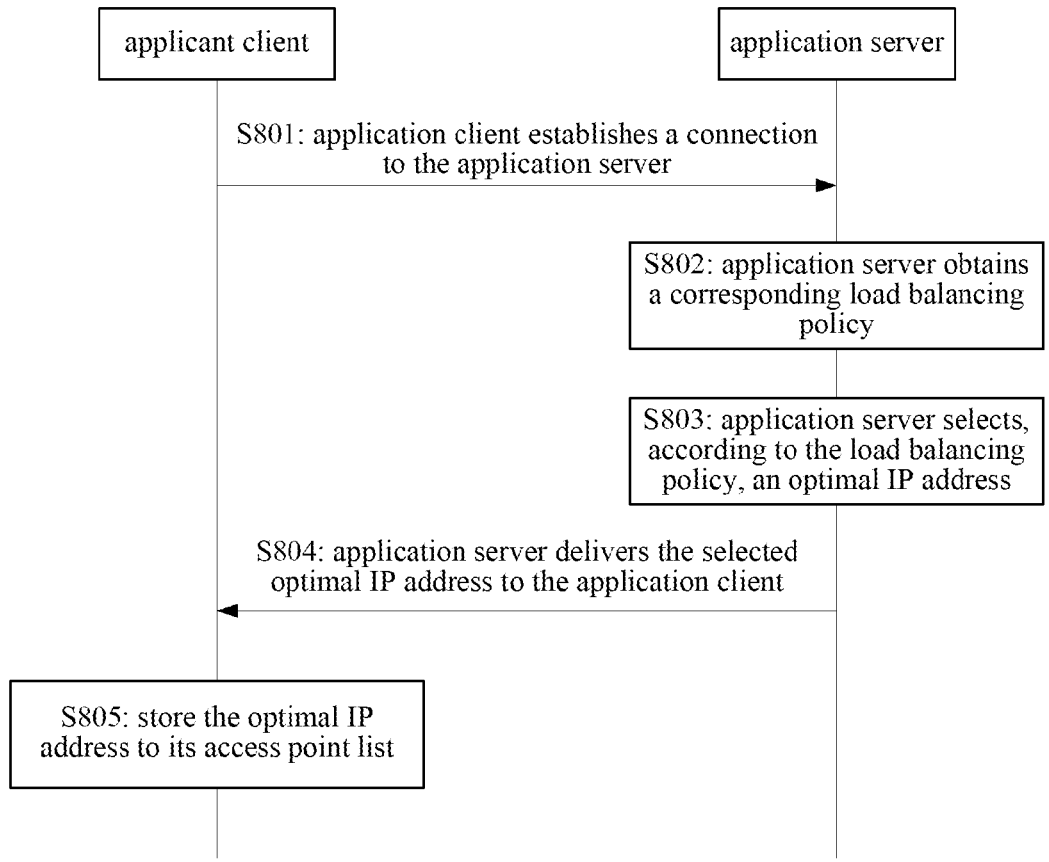
FIG. 8 illustrates a schematic diagram of an interaction process between an application client and an application server according to a sixth embodiment of the present disclosure.

In a sixth embodiment of the present disclosure, when an application (App) client initiates a request, an application (App) server may obtain, according an IP address of an access point of the client, geographic information and network operator information of the App client. The App server selects, according to a load balancing policy including a processing capability of the server, the geographic information and network operator information of the App client, and the like, an optimal IP address and delivers the IP address to the client. Reference may be made to FIG. 8, which illustrates an interaction process between an application client and an application server according to this embodiment, including steps S801 to S805.

In step S801, the application client establishes a connection to the application server.

The applicant client traverses an access points list, tries to connect to the application server by using IP addresses or server domain names therein one by one, and if the connection succeeds, stores an IP address of this connection success.

In step S802, the application server obtains a corresponding load balancing policy.

The load balancing policy may include a static load balancing policy and a dynamic load balancing policy. The static load balancing policy is a method of using average load information of a system but ignoring a current load status of the system. For example, a round robin algorithm is a typical static load balancing policy, in which it is considered that a processing capability of a cluster server has no difference at any time, all of requests from a network are allocated to all servers in the cluster server in turn from 1 to N, and then the allocation is restarted from 1. In this embodiment, the static load balancing policy includes one or any combination of a round robin algorithm, a priority algorithm, an IP-based algorithm, a header/request-based algorithm, and a cookie-based algorithm. The dynamic load balancing policy is a method of adjusting task allocation according to a current load status of a system. For example, a weighted round robin algorithm is a typical dynamic load balancing policy, in which a weight is dynamically adjusted by taking a performance difference between servers and a current load status of a server into consideration, and task requests are allocated to all servers by means of a round robin method in order of weight. A server having a high weight can process more task requests than a server having a low weight. In this embodiment, the dynamic load balancing policy includes one or any combination of a weighted round robin algorithm, a least connection algorithm, a weighted least connection algorithm, a locality-based least connection algorithm, a locality-based least connection with duplication algorithm, and a fastest response algorithm. For example, if a number of connections on a server is recorded in load information of the server, the load balancing policy may be a policy of using the least connections, that is, when a load balancing device selects a server to serve a client that currently initiates a request, the load balancing device may select a server having the least connections thereon to serve this request. In this embodiment, the load balancing policy may be that the application server queries an IP information library according an IP address of the client and obtains, according to the processing capability of the server, the geographic information and network operation information of the App client, and the like, a corresponding load balancing policy.

In step S803, the application server selects, according to the load balancing policy, an optimal IP address.

In step S804, the application server delivers the selected optimal IP address to the application client.

In step S805, the application client stores the optimal IP address to its access point list.

Figure 9:
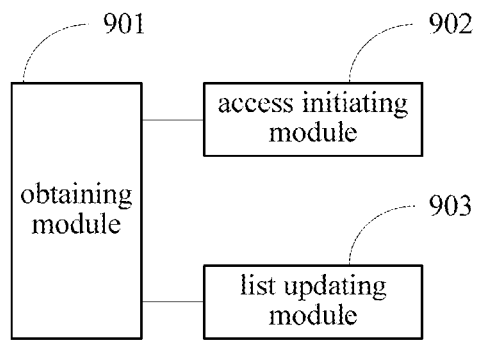
FIG. 9 illustrates a structural schematic diagram of a device for accessing an application server according to a seventh embodiment of the present disclosure.

Reference may be made to FIG. 9, which is a structural schematic diagram of a device for accessing an application server according to a seventh embodiment of the present disclosure. For the convenience of description, only parts related to the embodiment of the present disclosure are illustrated. The device for accessing an application server illustrated in FIG. 9 may be an intelligent terminal or a certain functional module/unit in an intelligent terminal and includes an obtaining module 901, an access initiating module 902, and a list updating module 903.

The obtaining module 901 is configured to obtain an IP address or a server domain name for accessing an application server from an access point list. In this embodiment, an intelligent terminal maintains an access point list including accessible IP addresses and server domain names, the access point list is dynamically variable and includes a guaranteed IP address entry, a server domain name entry, and at least one blank entry used for storing a new IP address. The blank entry may be located before the guaranteed IP address entry and server domain name entry. The server domain name entry is used for storing a server domain name, and keeps invariable; the guaranteed IP address entry is used for storing a guaranteed IP address. The guaranteed IP address exists during access point initialization; and in the case of obtaining an IP address or accessing the application server by parsing the server domain name stored in the domain name entry fails, the IP address can still be used for accessing to the application server. FIG. 2-*a* and FIG. 2-*b* are both schematic diagrams of an access point list during initialization according to this embodiment, and the two access point list schematic diagrams respectively include an guaranteed IP address entry, a server domain name entry, and two blank entries (a blank entry 1 and a blank entry 2) used for storing a new IP address.

The access initiating module 902 is configured to initiate an access to the application server by using the obtained IP address or server domain name.

The list updating module 903 is configured to update, after the access to the application server succeeds, the access point list by storing an IP address delivered, according to a load balancing policy, by the application server to a blank entry of the access point list. In this embodiment, the load balancing policy may include a static load balancing policy and a dynamic load balancing policy. The static load balancing policy is a method of using average load information of a system but ignoring a current load status of the system. For example, a round robin algorithm is a typical static load balancing policy, in which it is considered that a processing capability of a cluster server has no difference at any time, all of requests from a network are allocated to all servers in the cluster server in turn from 1 to N, and then the allocation is restarted from 1. In this embodiment, the static load balancing policy includes one or any combination of a round robin algorithm, a priority algorithm, an IP-based algorithm, a header/request-based algorithm, and a cookie-based algorithm. The dynamic load balancing policy is a method of adjusting task allocation according to a current load status of a system. For example, a weighted round robin algorithm is a typical dynamic load balancing policy, in which a weight is dynamically adjusted by taking a performance difference between servers and a current load status of a server into consideration, and task requests are allocated to all servers by means of a round robin method in order of weight. A server having a high weight can process more task requests than a server having a low weight. In this embodiment, the dynamic load balancing policy includes one or any combination of a weighted round robin algorithm, a least connection algorithm, a weighted least connection algorithm, a locality-based least connection algorithm, a locality-based least connection with duplication algorithm, and a fastest response algorithm. For example, if a number of connections on a server is recorded in load information of the server, the load balancing policy may be a policy of using the least connections, that is, when a load balancing device selects a server to serve a client that currently initiates a request, the load balancing device may select a server having the least connections thereon to serve this request.

In this embodiment, division of the respective functional modules is only used as an example for description. In actual application, the foregoing functions may be implemented by different functional modules by means of allocation according to requirements, for example, configuration requirements of corresponding hardware or consideration of convenience in software implementation, that is, an internal structure of the device for accessing an application server is divided into different functional modules to implement all or some of the described-above functions. In addition, in actual application, the corresponding functional modules in this embodiment may be implemented by corresponding hardware or may be implemented by corresponding hardware by executing corresponding software, for example, the foregoing obtaining module may be hardware having a function of obtaining an IP address or a server domain name for accessing an application server from an access point list, for example, an obtainer, or may be a common processor or another hardware device capable of executing a corresponding computer program so as to implement the foregoing function; further, the foregoing list updating module may be hardware having a function of updating, after the access to the application server is successfully performed, the access point list so as to store an IP address delivered, according to the load balancing policy, by the application server to an initial position before the IP address of the access point list, for example, a list updater, or may be a common processor or another hardware device capable of executing a corresponding computer program so as to implement the foregoing function.

After the access to the application server succeeds, the list updating module updates the access point list by storing an IP address delivered, according to a load balancing policy, by the application server to a blank entry of the access point list. As compared with the conventional art, with the device according to the embodiment of the present disclosure, an access success rate of a user by performing load balancing is improved according to characteristics of the application on an application server side.

FIG. 10 is a structural schematic diagram of a device for accessing an application server according to an eighth embodiment of the present disclosure. In this embodiment, the obtaining module 901 may include a traversing unit 1001. The traversing unit 1001 is configured to traverse the access point list with an initial position of the access point list as a starting point and use an IP address or a server domain name which is obtained initially during the traversing as the IP address or server domain name for accessing the application server. For example, with regard to the access point list illustrated in FIG. 2-a, neither of the blank entries thereof has an IP address during initialization, and the traversing unit 1001 may use the blank entry 2 used as an initial position of the access point list to start traversing the access point list. Because the server domain name entry in the access point list shown in FIG. 2 is located before the guaranteed IP address entry, the access initiating module 902 uses a server domain name, which is obtained initially by the traversing unit 1001 during the traversing, in the server domain name entry as the server domain name for accessing the application server. With regard to the access point list illustrated in FIG. 2-b, neither of the blank entries thereof has an IP address during initialization, and the blank entry 2 may be used as an initial position of the access point list to start traversing the access point list. Because the guaranteed IP address entry in the access point list shown in FIG. 2 is located before the server domain name entry, the access initiating module 902 uses a guaranteed IP address, which is obtained initially by the traversing unit 1001 during the traversing, in the guaranteed IP address entry as the IP address for accessing the application server.

FIG. 11 is a structural schematic diagram of a device for accessing an application server according to a ninth embodiment of the present disclosure. In this embodiment, the access initiating module 902 may include a first access initiating unit 1101 and a cyclic access initiating unit 1102.

The first access initiating unit 1101 is configured to initiate a first access to the application server by using the obtained IP address or server domain name. For example, it is assumed that an IP address (including the guaranteed IP address in the guaranteed IP address entry or the new IP address saved in the blank entry) is obtained by the obtaining module 901, the first access initiating unit 1101 may initiate the first access to the application server by using a fixed IP address. If a server domain name in the server domain name entry is obtained by the obtaining module 901, an application client sends a domain name address parsing request to a domain name server, after receiving the parsing request, the domain name server returns an IP address in response to the application client, and the first access initiating module 1001 further initiates, according to the IP address returned by the domain name server, the first access to the application server.

The cyclic access initiating unit 1102 is configured to further obtain, if the first access to the application server fails, other IP address or server domain name for accessing the application server from the access point list until the access to the application server succeeds.

FIG. 12-a, FIG. 12-b, or FIG. 12-c is a structural schematic diagram of a device for accessing an application server according to a tenth embodiment of the present disclosure. In this embodiment, a list updating module 901 may include a first receiving unit 1201 and an updating unit 1202.

The first receiving unit 1201 is configured to receive an IP address delivered, according to the load balancing policy, by the application server after the access to the application server succeeds. In this embodiment, the load balancing policy may include a static load balancing policy and a dynamic load balancing policy. The static load balancing policy is a method of using average load information of a system but ignoring a current load status of the system. For example, a round robin algorithm is a typical static load balancing policy, in which it is considered that a processing capability of a cluster server has no difference at any time, all of requests from a network are allocated to all servers in the cluster server in turn from 1 to N, and then the allocation is restarted from 1. In this embodiment, the static load balancing policy includes one or any combination of a round robin algorithm, a priority algorithm, an IP-based algorithm, a header/request-based algorithm, and a cookie-based algorithm. The dynamic load balancing policy is a method of adjusting task allocation according to a current load status of a system. For example, a weighted round robin algorithm is a typical dynamic load balancing policy, in which a weight is dynamically adjusted by taking a performance difference between servers and a current load status of a server into consideration, and task requests are allocated to all servers by means of a round robin method in order of weight. A server having a high weight can process more task requests than a server having a low weight. In this embodiment, the dynamic load balancing policy includes one or any combination of a weighted round robin algorithm, a least connection algorithm, a weighted least connection algorithm, a locality-based least connection algorithm, a locality-based least connection with duplication algorithm, and a fastest response algorithm. For example, if a number of connections on a server is recorded in load information of the server, the load balancing policy may be a policy of using the least connections, that is, when a load balancing device selects a server to serve a client that currently initiates a request, the load balancing device may select a server having the least connections thereon to serve this request.

The updating unit 1202 is configured to store the IP address delivered, according to the load balancing policy, by the application server to the blank entry.

For example, it is assumed that after the application server is accessed, the access point list illustrated in FIG. 2-a includes one IP address (which is assumed to be IP2), as shown in FIG. 3-a. It is further assumed that the application server is successfully accessed by using the IP2, the application server delivers, according to the load balancing policy, a new IP address and record the new IP address as IP3. The first receiving unit 1201 receives the delivered new IP address, namely, the IP3, and the updating unit 1202 stores the IP address delivered, according to the load balancing policy, by the application server, namely, the IP3, to the blank entry 1 in the access point list, and the access point list after the IP3 is stored is shown in FIG. 3-b.

FIG. 13-a, FIG. 13-b, or FIG. 13-c is a structural schematic diagram of a device for accessing an application server according to an eleventh embodiment of the present disclosure. In this embodiment, a list updating module 901 may include a first storing unit 1301, a second receiving unit 1302, and a second storing unit 1303.

The first storing unit 1301 is configured to store the IP address during a first access success to the blank entry, where the IP address during the first access success is a guaranteed IP address in the guaranteed IP address entry or an IP address obtained by parsing a server domain name in the server domain name entry.

The second receiving unit 1302 is configured to receive an IP address delivered, according to the load balancing policy, by the application server after the access to the application server succeeds. Similar to FIG. 12, in this embodiment, the load balancing policy may include a static load balancing policy and a dynamic load balancing policy. The static load balancing policy is a method of using average load information of a system but ignoring a current load status of the system. For example, a round robin algorithm is a typical static load balancing policy, in which it is considered that a processing capability of a cluster server has no difference at any time, all of requests from a network are allocated to all servers in the cluster server in turn from 1 to N, and then the allocation is restarted from 1. In this embodiment, the static load balancing policy includes one or any combination of a round robin algorithm, a priority algorithm, an IP-based algorithm, a header/request-based algorithm, and a cookie-based algorithm. The dynamic load balancing policy is a method of adjusting task allocation according to a current load status of a system. For example, a weighted round robin algorithm is a typical dynamic balancing policy, in which a weight is dynamically adjusted by taking a performance difference between servers and a current load status of a server into consideration, and task requests are allocated to all servers by means of a round robin method in order of weight. A server having a high weight can process more task requests than a server having a low weight. In this embodiment, the dynamic load balancing policy includes one or any combination of a weighted round robin algorithm, a least connection algorithm, a weighted least connection algorithm, a locality-based least connection algorithm, a locality-based least connection with duplication algorithm, and a fastest response algorithm. For example, if a number of connections on a server is recorded in load information of the server, the load balancing policy may be a policy of using the least connections, that is, when a load balancing device selects a server to serve a client that currently initiates a request, the load balancing device may select a server having the least connections thereon to serve this request.

The second saving unit 1303 is configured to store the IP address delivered, according to the load balancing policy, by the application server to an initial position of the access point list.

For example, it is assumed that the application server is accessed by using an IP address obtained by parsing a server domain name in the access point list illustrated in FIG. 2-*a*, the IP address is recorded as IP2. It is further assumed that the application server is successfully accessed by using the IP2, the application server delivers, according to the load balancing policy, a new IP address and record the new IP address as IP3. The second receiving unit 1302 receives the delivered new IP address, namely, the IP3, and because the initial position of the access point list at this time is the blank entry 1, the second saving unit 1303 stores the IP address delivered, according to the load balancing policy, by the application server, namely, the IP3, to the blank entry 1 in the access point list, and the access point list after the IP3 is stored is shown in FIG. 4-*a*. When the application server is accessed for a next time, the access point list illustrated in FIG. 4-*a* is traversed, and if the application server is successfully accessed by using the IP3, the application server delivers a new IP address according to the load balancing policy and record the new IP address as IP4. The second receiving unit 1302 receives the delivered new IP address, namely, the IP4, and because the initial position of the access point list at this time is the blank entry 1, the second saving unit 1303 stores the IP address delivered, according to the load balancing policy, by the application server, namely, the IP4, to the blank entry 1 in the access point list, and the access point list after the IP4 is stored is shown in FIG. 4-*b*.

It should be noted that the contents, such as information interactions among the units and modules and the execution procedures, bring the technical effects the same as those of embodiments of the present disclosure as they are based on the same concept as the method embodiments of the present disclosure, which are no longer described here.

Persons of ordinary skill in the art should understand that, all of or a part of the steps in the method according to the embodiments may be implemented by a program instructing relevant hardware, for example, by means of one or more or all of the following methods:

obtaining an IP address or a server domain name for accessing an application server from an access point list, where the access point list includes a guaranteed IP address entry, a server domain name entry, and at least one blank entry used for storing a new IP address, where the blank entry may be located before the guaranteed IP address entry and server domain name entry;

initiating an access to the application server by using the obtained IP address or server domain name; and updating, after the access to the application server succeeds, the access point list by storing store an IP address delivered, according to a load balancing policy, by the application server to a blank entry of the access point list.

A person of ordinary skill in the art may understand that all or some of the steps in the various methods of foregoing embodiments may be implemented by a program instructing relevant hardware. The program may be stored in a computer readable storage medium. The storage medium may be a Read Only Memory (ROM), a Random Access Memory (RAM), a magnetic disk, an optical disc, or the like.

A method for accessing an application server and a device thereof according to embodiments of the present disclosure are described in detail above. The principle and implementation of the present disclosure are described herein through specific examples. The description about the embodiments of the present disclosure is merely provided for ease of understanding of the method and core ideas of the present disclosure. Persons of ordinary skill in the art can make variations to the present disclosure in terms of the specific implementations and application scopes according to the ideas of the present disclosure. Therefore, the content of the specification shall not be construed as a limit to the present disclosure.

What is claimed is:

1. A method for accessing an application server, applied to a terminal comprising a processor, wherein the method comprises:

obtaining, by the processor, an IP address or a server domain name for accessing an application server from an access point list, wherein the access point list comprises a guaranteed IP address entry, a server domain name entry, and at least one blank entry for storing a new IP address, wherein the blank entry is located before the guaranteed IP address entry and the server domain name entry;

initiating, by the processor, an access to the application server by using the IP address or server domain name; and updating, by the processor, after the access to the application server succeeds, the access point list by storing an IP address delivered, according to a load balancing policy, by the application server to a blank entry of the access point list;

wherein obtaining the IP address or the server domain name for accessing the application server from the access point list comprises:

traversing the access point list with an initial position of the access point list as a starting point and using an IP address or a server domain name which is obtained initially during the traversing as the IP address or server domain name for accessing the application server.

2. The method according to claim 1, wherein the initiating an access to the application server by using the IP address or server domain name comprises:

initiating a first access to the application server by using the IP address or server domain name; and obtaining, if the first access to the application server fails, other IP address or server domain name for accessing the application server from the access point list until the access to the application server succeeds.

3. The method according to claim 1, wherein the updating the access point list by storing an IP address delivered, according to a load balancing policy, by the application server to a blank entry of the access point list comprises:

receiving the IP address delivered, according to the load balancing policy, by the application server after the access to the application server succeeds; and storing the IP address delivered, according to the load balancing policy, by the application server to the blank entry.

4. The method according claim 1, wherein the access point list comprises a plurality of blank entries.

5. The method according to claim 4, wherein the updating the access point list by storing an IP address delivered, according to a load balancing policy, by the application server to a blank entry of the access point list comprises:

storing the IP address during a first access success to a blank entry other than an initial blank entry of the plurality of blank entries, wherein the IP address during the first access success is a guaranteed IP address in the guaranteed IP address entry or an IP address obtained by parsing a server domain name in the server domain name entry;

receiving the IP address delivered, according to the load balancing policy, by the application server; and storing the IP address delivered, according to the load balancing policy, by the application server to the initial blank entry of the plurality of blank entries.

6. A device for accessing an application server, comprising a processor and a memory having a processor-executable instruction stored therein, and the instruction when executed by the processor, configure the processor to:

an obtaining module, configured to obtain an IP address or a server domain name for accessing an application server from an access point list, wherein the access point list comprises a guaranteed IP address entry, a server domain name entry, and at least one blank entry for storing a new IP address, wherein the blank entry is located before the guaranteed IP address entry and the server domain name entry;

an access initiating module, configured to initiate an access to the application server by using the IP address or server domain name; and a list updating module, configured to update, after the access to the application server succeeds, the access point list by storing an IP address delivered, according to a load balancing policy, by the application server to a blank entry of the access point list;

wherein when the processor obtains the IP address or a server domain name for accessing the application server from the access point list, the processor traverses the access point list with an initial position of the access point list as a starting point and user an IP address or a server domain name which is obtained initially during the traversing as the IP address or server domain name for accessing the application server.

7. The device according to claim 6, wherein the processor is configured to:

a first access initiating unit, configured to initiate a first access to the application server by using the IP address or server domain name; and a cyclic access initiating unit, configured to obtain, if the first access to the application server fails, other IP address or server domain name for accessing the application server from the access point list until the access to the application server succeeds.

8. The device according to claim 6, wherein the processor is configured to:

a first receiving unit, configured to receive an IP address delivered, according to the load balancing policy, by the application server after the access to the application server succeeds; and an updating unit, configured to store the IP address delivered, according to the load balancing policy, by the application server to the blank entry.

9. The device according to claim 6, wherein the processor is configured to:

a first store that stores the IP address during a first access success to a blank entry other than an initial blank entry of the plurality of blank entries, wherein the IP address during the first access success is a guaranteed IP address in the guaranteed IP address entry or an IP address obtained by parsing a server domain name in the server domain name entry;

a second receiving unit, configured to receive an IP address delivered, according to the load balancing policy, by the application server after the access to the application server succeeds; and a second saving unit, configured to store the IP address delivered, according to the load balancing policy, by the application server to the initial blank entry of the plurality of blank entries.

10. A non-transitory computer readable storage medium, having computer executable instructions stored therein and performing the following steps when the computer executable instructions are run in a computer:

obtaining an IP address or a server domain name for accessing an application server from an access point list, wherein the access point list comprises a guaranteed IP address entry, a server domain name entry, and at least one blank entry for storing a new IP address, wherein the blank entry is located before the guaranteed IP address entry and the server domain name entry;

initiating an access to the application server by using the IP address or server domain name; and updating, after the access to the application server succeeds, the access point list by storing an IP address delivered by the application server to a blank entry of the access point list;

wherein obtaining the IP address or a server domain name for accessing the application server from the access point list comprises:

traversing the access point list with an initial position of the access point list as a starting point and using an IP address or a server domain name which is obtained initially during the traversing as the IP address or server domain name for accessing the application server.

* * * * *